Feb. 1, 1927.

N. J. JEWETT 1,615,982

GOLF GAME

Filed May 29, 1925

Inventor

Nelson J Jewett
pro se

Patented Feb. 1, 1927.

1,615,982

UNITED STATES PATENT OFFICE.

NELSON J. JEWETT, OF JEWELL STATION, VIRGINIA.

GOLF GAME.

Application filed May 29, 1925. Serial No. 33,713.

The invention relates to games of chance and particularly to a game to simulate the game of golf.

An object of the invention is the provision of a game of the class described, having a plurality of chance devices for cooperative use, one of such devices to give a distance indication and the other thereof a direction indication.

A further object of the invention is the provision of a plurality of distance chance indicators with a single direction chance indicator which may be used with the chosen one of the distance indicators.

A further object of the invention is the provision of a novel form of game board.

A further object of the invention is the provision of movable hazards bearing distance and direction markings, which may be placed upon the surface of the game-board so as to vary the play whereby a single course may be changed to represent a large number of different holes.

A further object of the invention is the provision of movable means to represent water hazards with variable boundaries.

Further objects of the invention will appear from the following description, when read in connection with the accompanying drawing, wherein—

Figures 1, 2, 3:
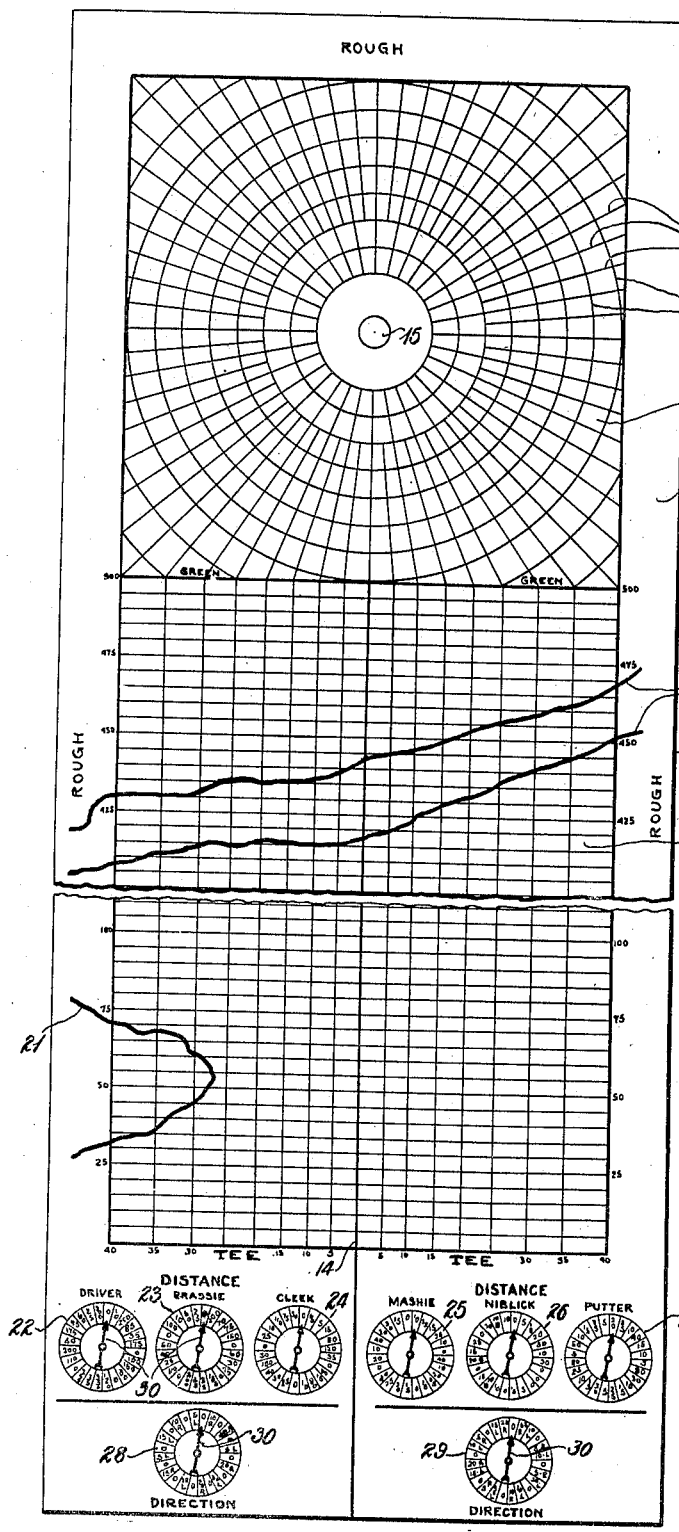
Fig. 1 is a plan view of a form of board bearing chance devices in the nature of removable pointers, the view being cut away to shorten the same.
Figs. 2 and 3 are plan views respectively of forms of movable hazards or bunkers.

As shown, the board 10 is lined to represent a "fairway" 11, a "green" 12, and a margin about the same, as at 13, representing a rough.

Preferably the "fairway" as shown is provided with longitudinal lines to give an indication of direction by giving a measure of distance from the central line 14 thereof. These lines are desirably marked for convenience with numerals supposedly representing yards. The "fairway" is further provided with transverse lines shown as provided with indication numbering, representing yards, extending up to five hundred yards.

The "green", is shown as marked with direction indicating lines 19 formed radially so that all directions will lead toward the circle 15 at the center which represents the "hole".

For the provision of distance markings upon the "green" there are shown concentric circles 16, which may be estimated as one yard each, if desired, for purposes of rules of play.

The end line of the "fairway" has been marked as T, and the drive will be calculated from this line, and the position of the drive from an agreed point from the line, usually at the center line 14.

If it is desired to introduce a short hole into the play, the T may be, by agreement, moved up to any agreed point upon the "fairway" for the purpose of an individual hole.

To represent "bunkers", there are shown bits of material such as card, in Figs. 2 and 3; that shown at 17 in Fig. 2 being lined to substantially agree with the outside spaces between the longitudinal direction lines upon the "fairway" and that shown at 18 in Fig. 3 being lined to agree with a central position upon the "fairway".

The direction lines upon the "fairway" are unequally spaced in order to meet the direction lines 19 of the "green".

The hazard or bunker cards 17 and 18 are so lined as to coincide with the direction lines upon the "fairway" in a certain position, and may be moved a few spaces from this position without such a hiatus of registry with the direction lines upon the "fairway" as to interfere with the determination of the proper direction indicated by the chance devices.

To represent water hazards there are shown flexible members 20—21, which may be laid loosely upon the surface of the board at any chosen position. As shown, the space between the members 20 would represent a stream and the space enclosed by the member 21 would represent a pond of water. For these members 20 and 21, pieces of string may desirably be utilized which, if laid loosely upon the board, will assume a sufficiently irregular course to give a fair representation of the boundaries of a water hazard.

The rules of the game will usually provide that any space enclosed by distance and direction lines, which is cut by one of the members 20 or 21, shall be accepted as falling within the boundary of the water hazard and that a certain club as, for instance, the niblick must be used when playing out of the water hazard, as well as out of a bunker 17 or 18 or out of the rough 13. This will produce a penalty, as will be indicated when the markings upon the club chance devices are considered.

The chance devices 22, 23, 24, 25, 26 and 27 are shown as marked to designate six clubs. The clubs which normally produce the greatest distance of carry, as the driver, brassy, and cleek, have been grouped and provided with a single direction indicator 28, and the markings upon the direction indicator are so chosen as to provide a fair degree of accuracy of direction.

The distances secured by the driver are the greatest as provided by the markings followed by the brassy and by the cleek. Each of the dials is shown as provided with certain zero indications to represent a "foozle".

The distances possible of securing by means of the mashie, niblick, and putter are made less and are roughly chosen to provide, as near as possible, a similitude of the results secured in actual outdoor play. These devices are grouped and have a direction indicator 29 provided for use therewith. Each of the dials is shown as equipped with a pointer 30, which is mounted for free revolution and which may be spun so as to give a chance indication upon stoppage. It will be obvious that properly marked dice or spinning teetotums might be substituted for the dials shown herein.

Upon the niblick dial are a number of indications which provide that the movable object utilized upon the board to represent the ball shall be moved backward.

The rules will provide that the player may have his choice of clubs, with the exception that the putter must be used upon the "green" and the niblick out of the penalties, as above indicated. Otherwise, the player, by wise choice of clubs may improve his game.

Minor changes may be made in the physical embodiment of the invention without departing from the spirit thereof.

I claim:

1. A game apparatus comprising, in combination, a board bearing a playing space, distance and direction markings upon said space, a chance device having indications thereon to determine the distance of movement of a piece, and a second chance device having indications thereon to determine the direction of movement of a piece.

2. A game apparatus comprising, in combination, a board bearing a playing space, a plurality of distance-indicating chance devices adapted to determine the distance of movement of a piece upon said space and a direction chance device common to said plurality of distance devices to determine the direction of movement of a piece, the distance of movement of which is determined by the chosen distance device.

3. A game apparatus comprising, in combination, a board bearing a playing space, distance and direction markings upon said space, a plurality of distance-indicating chance devices adapted to determine the distance of movement of a piece upon said space and a direction chance device common to said plurality of distance devices to determine the direction of movement of a piece, the distance of movement of which is determined by the chosen distance device.

4. A game apparatus comprising, in combination, a board bearing a playing space divided into a course and a green, longitudinal and transverse lines upon said course to determine direction and distance of movement of a piece, radial and circular lines upon said green to determine the direction and distance of movement of a piece, and distance and direction chance devices to determine the corresponding elements of movements of a piece upon said board.

5. A game apparatus comprising, in combination, a board bearing a playing space divided into a course and a green, longitudinal and transverse lines upon said course to determine direction and distance of movement of a piece, radial and circular lines upon said green to determine the direction and distance of movement of a piece, certain of said radial lines forming continuations of said longitudinal lines upon the course, and distance and direction chance devices to determine the corresponding elements of movements of a piece upon said board.

6. A game apparatus comprising, in combination, a board bearing a playing space divided into a course and a green, longitudinal and transverse lines upon said course to determine direction and distance of movement of a piece, radial and circular lines upon said green to determine the direction and distance of movement of a piece, distance and direction chance devices to determine the corresponding elements of movements of a piece upon said board, and a space enclosing said course and green to represent the rough of a golf course.

7. A game apparatus comprising, in combination, a board having distance and direction indications thereon, a movable piece having corresponding distance and direction indications thereon adapted to substantially register with said first-named indications, whereby said movable piece may be placed at a chosen position upon said board to represent a hazard.

8. A game apparatus comprising, in combination, a board bearing a playing surface having distance and direction indications thereon, a laterally narrow flexible member movably laid upon said surface to determine a boundary of a space simulating a water hazard upon any chosen portion of said surface.

9. A game apparatus comprising, in combination, a board bearing a playing surface having direction and distance indications thereon, a plurality of distance chance devices, each bearing a designation of a distance-getting golf club, and a direction indicating chance device adapted to be used in common with a chosen club, said last named chance device to determine the direction of the shot indicated upon said chosen first-named chance device.

10. A game apparatus comprising, in combination, a board having distance and direction markings thereon, a loose cord movably laid upon said board to irregularly cut across said markings whereby to demark a boundary of a water hazard.

NELSON J. JEWETT.